United States Patent [19]

Ito et al.

[11] Patent Number: 4,677,015

[45] Date of Patent: Jun. 30, 1987

[54] TRANSFER SHEET

[75] Inventors: Michio Ito; Kiyoshi Kambayashi; Junichi Takezawa, all of Nagaoka, Japan

[73] Assignee: Nippon Seiki Co., Ltd., Nagaoka, Japan

[21] Appl. No.: 731,148

[22] Filed: May 6, 1985

[30] Foreign Application Priority Data

Dec. 28, 1984 [JP] Japan ................................ 59-275745

[51] Int. Cl.[4] ........................... B41M 3/12; B32B 3/18

[52] U.S. Cl. .................................... 428/201; 428/209; 428/212; 428/214; 428/216; 428/354; 428/914

[58] Field of Search ............... 156/233, 234, 240, 249, 156/277; 428/209, 354, 913, 914, 195, 201-204, 207, 212, 214-216

[56] References Cited

U.S. PATENT DOCUMENTS 3,131,106 4/1964 Mackenzie .
3,494,776 2/1970 Sinclair et al. .
3,869,336 3/1975 Sander et al. .
3,900,633 8/1975 Piron .
3,975,563 8/1976 Franer et al. .
4,477,312 10/1984 Czichy ................................ 428/209

*Primary Examiner*—Bruce H. Hess
*Attorney, Agent, or Firm*—Lowe, Price, LeBlanc, Becker & Shur

[57] ABSTRACT

There is provided a transfer sheet made up of a flexible substrate, a laminated image part composed of metal layer and printed film layer, and an adhesive layer formed on the image part. The printed film layer has an elongation at break greater than approximately 4% and has a thickness greater than approximately 4 μm. The peel strength between the substrate and the metal layer is smaller than approximately 10 g/25 mm width, and the adhesion strength between the metal layer and the printed film layer and between the printed film layer and the adhesive layer is greater than approximately 4 kg/cm$^2$. Because of these characteristic values, the transfer sheet permits the image part including the metal layer to be released without breakage and permits satisfactory transfer.

2 Claims, 6 Drawing Figures

TRANSFER SHEET

BACKGROUND OF THE INVENTION

1. Field of the Invention:

The present invention relates to a transfer sheet which is designed to transfer a printed image having metallic luster to an object. More particularly, it relates to a transfer sheet which is constructed such that the printed image is tranferred together with a laminate of metal layer and printed film layer.

2. Description of the Prior Art:

Heretofore, there has been known a transfer sheet designed to transfer a printed image having metallic luster to an object. It is disclosed in Japanese Patent Publication No. 41915/1980 and U.S. Pat. Nos. 3,494,776, 3,869,336, 3,900,633, 3,975,563, and 3,131,106. The known conventional transfer sheet is made up of a flexible substrate, a release layer having weak adhesion, a metal layer having a printed image, and a pressure sensitive adhesive layer laminated one over another in the order mentioned. The transfer of the printed image is accomplished by pressing the transfer sheet against an object.

In the transfer sheet above, the printed image is required to be transferred to an object having irregular or curved surfaces. To meet this requirement, the printed image layer should preferably be flexible enough to adhere closely to the surface of any configuration. However, this is practically impossible because the metal layer has to have a certain thickness to ensure the satisfactory transfer of printed image.

Although a very thin metal foil is sufficient to impart metallic luster to a printed image, it is easy to break when peeled off from the substrate for transfer to an object. If it is replaced with a thick one, adhesion to curved surfaces would be unsatisfactory.

It is conjectured that if the adhesion of a printed image to an object is increased so that it is easily peeled off from the substrate, it would be possible to prevent the metal layer from breaking during transfer. Experiments to prove this conjecture indicated that a pressure sensitive adhesive having a high adhesion strength makes it difficult to locate a printed image exactly on a desired position. In the case where a plurality of printed images are on one substrate, an excessively tacky pressure sensitive adhesive causes not only desired printed images but also undesired adjacent printed images to be transferred to an object. Also, such an adhesive makes it difficult to adjust the transfer position by slipping a transfer sheet on an object. In the case where a transfer sheet is entirely coated with such an adhesive, the one on non-image parts would also adhere to an object to impair the commercial value.

The disadvantage of excessive adhesion can be overcome by the use of a pressure sensitive adhesive having a low adhesion strength; but it does not perform the complete transfer of a printed image to an object. The low adhesion strength has to be compensated with the uniform pressing against an object. If the pressing is not uniform, there will be variation in adhesion to an object, and that part of the printed image where adhesion is not complete will stay on the substrate, or the printed image is partly damaged, when the transfer sheet is removed from an object.

SUMMARY OF THE INVENTION

It is an object of this invention to provide a transfer sheet designed to transfer a printed image having metallic luster. The transfer sheet of this invention permits the printed image to be securely transferred to an object without resorting to an excessively tacky adhesive. It prevents the printed image from being damaged by stress when peeled off from an object. Moreover, it permits easy positioning of the printed image on an object.

The above and other objects, features, and advantages of the present invention will become more apparent from the following description when taken in conjunction with the accompanying drawings in which preferred embodiments of the present invention are shown by way of illustrative example, and like reference characters designate like parts throughout.

DESCRIPTION OF THE PREFERRED EMBODIMENTS

The transfer sheet of this invention is made up of a substrate, a printed image formed thereon which is a laminate of metal layer and printed film layer, and an adhesive layer applied to the printed image. In some cases, it is provided with a topcoat to protect the coloring layer to give a colored metallic luster and to protect the metal foil.

The transfer sheet of this invention may be available in various structures according to the lamination as shown in FIG. 1. The printed image part having metallic luster is formed by providing the metal layer with a printed film layer of desired pattern according to the printed image or by forming a printed film layer with the photographic technology and performing etching using it as a mask. FIG. 1 shows the structure of the lamination without defining the printed image part.

Figure 1A:
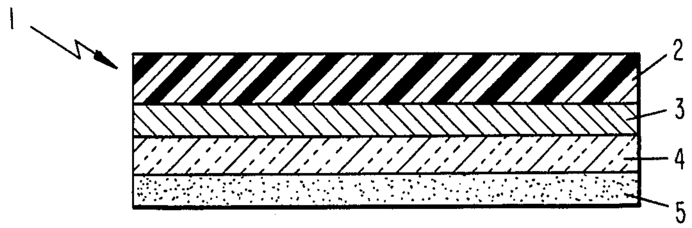
FIG. 1 shows sectional views of various transfer sheets of this invention which are different in lamination.

The transfer sheet of this invention in most basic structure is shown in FIG. 1(A). It is made up of a flexible substrate (2), a peelable metal layer (3), a printed film layer (4) having an elongation at break greater than approximately 4%, and a pressure-sensitive adhesive layer (5). For ease of handling, the adhesive layer (5) should preferably be covered with a release sheet. The substrate (2) may be formed by extruding a synthetic resin onto the metal layer (3). Alternatively, the metal layer (3) may be formed by vacuum deposition on a synthetic resin film. It is also possible to bond a synthetic resin fil and a metal foil to each other.

Figure 1B:
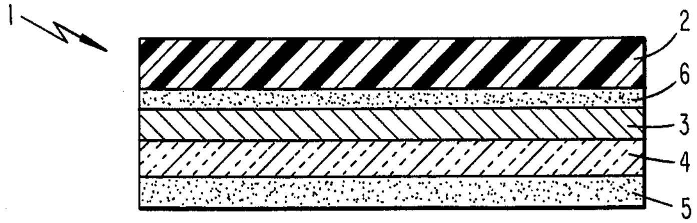
Figure 1C:
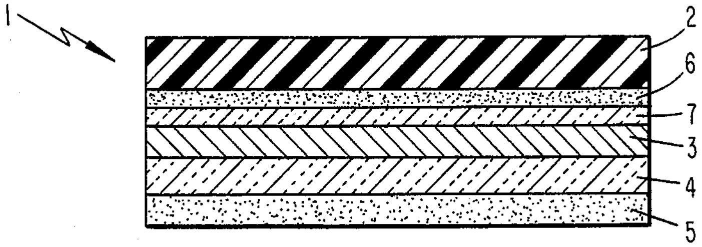

The metal layer (3) of aluminum foil, copper foil, or stainless steel foil may be bonded to the substrate (2) with a release layer (6) made of semi-aqueous adhesive, as shown in FIG. 1(B). The metallic luster may be colored by a coloring layer (7) formed on the metal layer (3) by printing, as shown in FIG. 1(C). The degree of metallic luster can be adjusted as required by properly establishing the transmittance of the coloring layer (7). In addition, the metal layer (3) may be covered with a topcoat (8) for protection from damage which might occur during handling before the formation of the printed film layer (4), as shown in FIG. 1(D).

Figure 1D:
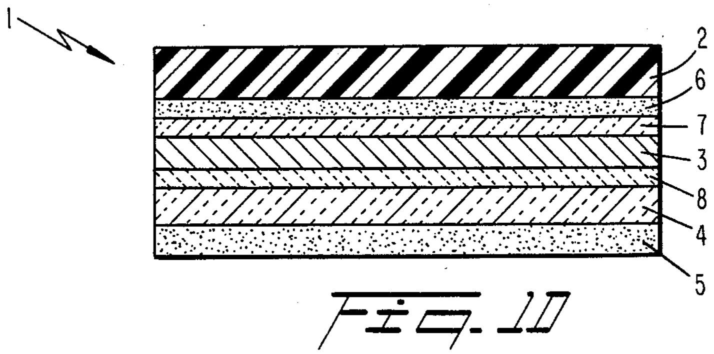
Figure 2A:
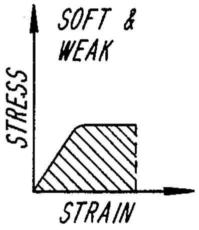
FIG. 2 shows stress-stain curves illustrating the performance of the printed film layer on the transfer sheet of this invention.
Figure 2B:
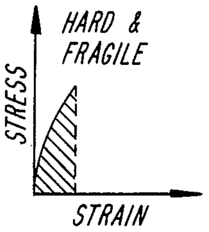
Figure 2C:
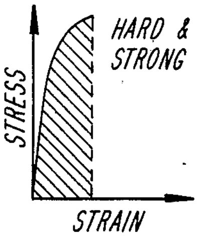
Figure 2D:
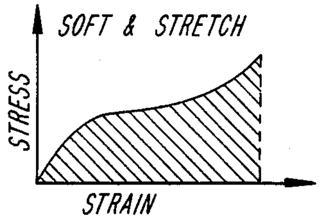
Figure 2E:
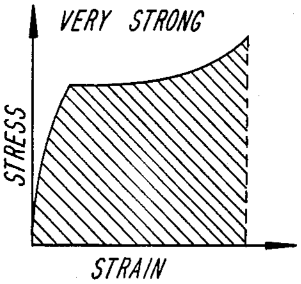

The transferable image with metallic luster is a lamination composed of the coloring layer (7), metal layer (3), and printed film layer (4) as shown in FIGS. 1(C) and 1(D). The printed film layer (4) takes part in the image part breaking at the time of transfer. It relieves the peeling stress exerted to the image part and helps peeling. Results of experiments indicate that the printed film layer (4) should be a tough material having a thickness greater than approximately 4 μm, preferably greater than 7 μm, and an elongation at break greater than approximately 4%. It prevents the image part from breaking and ensures the transfer of the image.

The breakage of the printed film layer (4) depends on stiffness (Young's modulus), toughness, and elongation. The one having a low Young's modulus is desirable from the view point of reducing the critical peel stress. On the other hand; toughness is determined by elongation at break as illustrated in the stress-strain curves in FIG. 2. It was experimentally found that the printed film layer is required to have an elongation at break greater than approximately 4% at room temperature. The one having such an elongation value is tough enough to ensure the image transfer without any damage to the image part.

The bond strength between layers constituting the laminate is another factor to be considered together with the elongation of the printed film layer (4). Experimental results indicate that satisfactory transfer can be achieved without delamination when the adhesion strength is lower than approximately 10 g/25 mm width between the substrate (2) and the metal layer (3), greater than approximately 4 $kg/cm^2$, preferably greater than 10 $kg/cm^2$, between the metal layer (3) and the printed film layer (4), and greater than approximately 4 $kg/cm^2$ between the printed film layer (4) and the adhesive layer (5), in the case of a lamination as shown in FIG. 1.

In the case of the transfer sheet (1) which satisfies the above-mentioned conditions, the image part can be formed most simply by etching, with the printed film layer (4) being used as a mask. (Etching is suitable for quantity production.) The printed film layer (4) should be formed with an ink which prevents the metal layer (3) thereunder from etching and firmly retains the adhesive layer (5) thereon. In other words, the ink should have resistance to an etching solution and affinity for an adhesive. A preferred one has resistance to acid and alkali and chemically bonds to an adhesive of ultraviolet curing type.

Figure 3A:
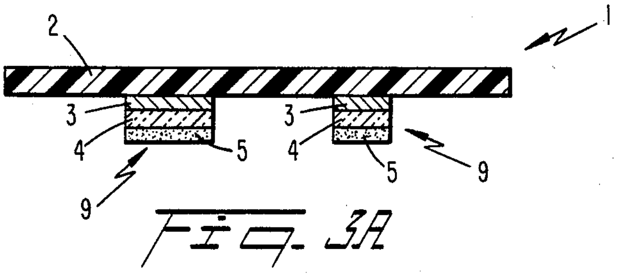
FIG. 3 shows sectional views of the adhesive layer of the transfer sheet of this invention.
Figure 3B:
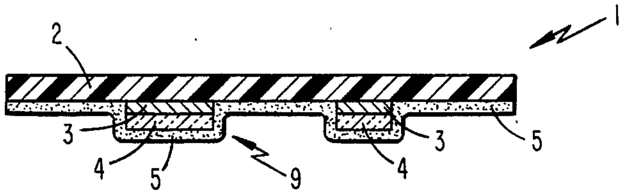

The adhesive layer (5) may be applied to the image part only or to the entire surface including the non-image part, too. The latter method is simple to perform if printing is made all over the surface. In an embodiment as shown in FIG. 3(A), the adhesive layer (5) is formed on the image part (9) only. In another embodiment as shown in FIG. 3(B), the adhesive layer (5) is made all over the entire surface of the transfer sheet (1). In yet another embodiment (not shown), the adhesive layer (5) is formed on the image part (9) as well as the outline. All of the embodiments perform satisfactory transfer of the image part (9) without causing the unnecessary adhesive to be transferred to an object.

EXAMPLE 1

Figure 4A:
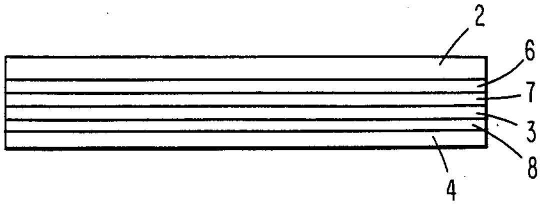
FIG. 4 to FIG. 6 show the various processes for producing the transfer sheet of this invention.
Figure 4B:
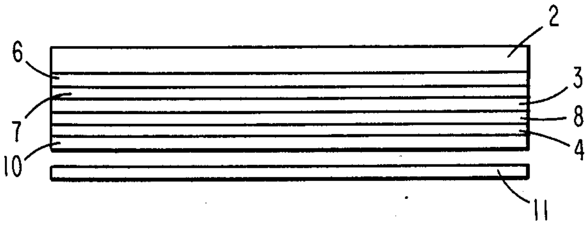

A transfer sheet as shown in FIG. 4(A) was prepared. The substrate (2) is a 0.05 mm thick polyester film. The release layer (6) was formed on the substrate. On the release layer was formed by printing the 2 μm thick coloring layer (7) which imparts a color to the metallic luster. The metal layer (3) was formed in a thickness of 5 μm by vacuum deposition of aluminum. The peel strength between the substrate and metal layer was approximately 3 g/25 mm width. The metal layer (3) was covered with the 2 μm thick protective topcoat. Finally, the printed film layer (4) was formed by applying an ink of the following composition.

| | | | |
|---|---|---|---|
| Composition 1: | Amino resin ink, white | | |
| | (a product of Sun Chemical K.K.) | | |
| Composition 2: | Amino resin | 23 | parts by weight |
| | Titanium white | 35 | parts by weight |
| | Plasticizer | 4 | parts by weight |
| | Solvent | 38 | parts by weight |
| | (Toluene, isopropyl alcohol, etc.) | | |
| Composition 3: | Amino resin | 23 | parts by weight |
| | Titanium white | 35 | parts by weight |
| | Nitrocellulose | 4 | parts by weight |
| | Plasticizer | 2 | parts by weight |
| | Solvent | 36 | parts by weight |
| | (Toluene, isopropyl alcohol, etc.) | | |

Using the inks of the above-mentioned compositions, printed film layers of different thickness were prepared as follows:

| Sample No. | No. 1 | No. 2 | No. 3 | No. 4 |
|---|---|---|---|---|
| Ink | Compn. 1 | Compn. 2 | Compn. 3 | Compn. 4 |
| Thickness | 7 μm | 3 μm | 7 μm | 7 μm |

Figure 4C:
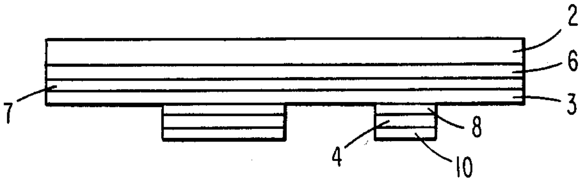

The printed film layer (4) as specified was formed to give a transfer sheet as shown in FIG. 4(A). Subsequently, the printed film (4) was coated with a water-soluble photosensitive material ("Chromatec", a product of Letraset Japan K.K.) to form the photosensitive layer (10). The photosensitive layer (10) was exposed to ultraviolet light through a negative film (11) placed thereon having an image of desired pattern to be transferred. After removal of the negative film (11), the development of the photosensitive layer was carried out by washing with water. As the result of this step, that part of the printed film layer (4) and topcoat (8) which is not covered with the image was removed, as shown in FIG. 4(C).

Figure 4D:
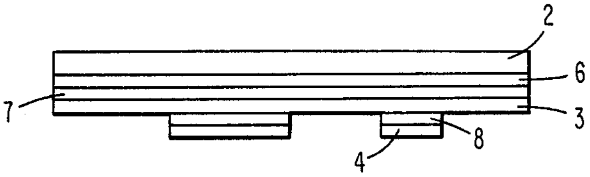
Figure 4E:
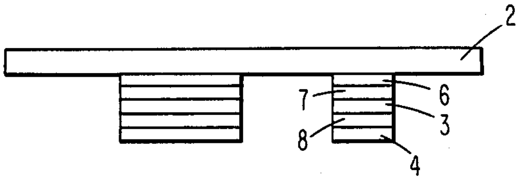

The remaining cured photosensitive layer (10) was removed by treating with a special solution. See FIG. 4(D). Using the printed film layer (4) as a mask, etching with 15% NaOH aqueous solution was performed to remove that part of the metal layer (3), coloring layer (7), and release layer (6) which is not covered by the image layer. After drying, there was obtained a sheet as shown in FIG. 4(E).

Figure 4F:
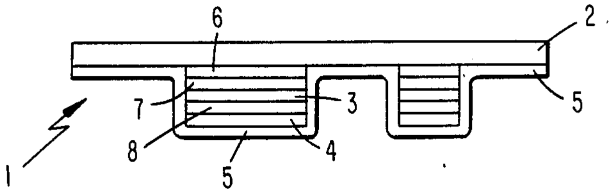

Finally, a pressure-sensitive adhesive of the following composition was applied all over the image part and non-image part to form the adhesive layer (5), as shown in FIG. 4(F).

| | | |
|---|---|---|
| Water | 45.27 | parts by weight |
| Nonionic surface active agent | 1.2 | parts by weight |
| Anionic surface active agent | 0.3 | parts by weight |
| Hydroxyethyl cellulose | 0.55 | parts by weight |

-continued

| | |
|---|---|
| Potassium persulfate | 0.33 parts by weight |
| Borax | 0.35 parts by weight |
| Copolymer of butyl acrylate (80%) and methyl methacrylate (20%) | 52.0 parts by weight |

The transfer sheet thus obtained was subjected to test for image transfer to drawing paper. In the case of sample No. 3 and No. 4, the image transfer was satisfactory and the transfer of the adhesive on the non-image part did not take place.

The reason why the adhesive on the non-image part was not transferred to the object was that the adhesion strength between the adhesive and the substrate (2) is greater than that between the adhesive and the object. This is attributed to the distribution of borax in the adhesive layer (5). In other words, there is more resin on the adherend surface of the substrate (2) and there is more borax on the adherend surface of the object (2). Thus the transfer sheet of this invention does not make an object unsightly with transferred adhesive.

Preventing the transfer of adhesive to an object by the use of different in adhesion strengths is disclosed in U.S. Pat. No. 3,131,106 covering a transfer sheet having no metal layer. It is not concerned directly with the structure of the transfer sheet of this invention.

The relationship between the elongation at break of the printed film layer (4) and the transfer performance was investigated by measuring the physical properties of the film formed by casting each ink of the above-composition No. 1 to No. 3 on a glass plate. Elongation was measured at a pulling rate of 200 mm/min according to JIS Z1521 (for testing cellophane). Test results were as follows:

| Sample No. | No. 1 | No. 2 | No. 3 | No. 4 |
|---|---|---|---|---|
| State of transfer | Poor | Fair | Good | Good |
| Elongation at break | 2% | 6% | 6% | 7% |

In the case of the printed film layer (4) formed with ink No. 3 or No. 4 (which gave an elongation of approximately 6% or 7%, respectively), the transfer of the image part was performed satisfactorily. However, in the case of the printed film layer (4) formed with ink No. 1 (which gave an elongation of approximately 2%), the transfer was quite unsatisfactory due to breakage in the image part. In the case of the printed film layer (4) formed with ink No. 2 (which is identical to No. 3), good transfer was not accomplished under the same load because the film thickness of 3 μm and the image part was cracked when it was pressed under a load of about 50 to 80 g with a standard ball point pen having a ball 1 mm in diameter. It was concluded from the above-mentioned experimental results that the printed film layer (4) should be thicker than approximately 4 μm and should have an elongation at break greater than approximately 4%. It permits good transfer under a light load.

In the process of this example, the photosensitive material which had been cured on exposure was removed as mentioned above. If this step is omitted and the adhesive layer (5) is formed directly on the photosensitive material, the adhesive layer alone is transferred to an object and the image part is not transferred because of poor adhesion between the two layers. Thus it was found that the affinity of the printed film layer (4) for the adhesive greatly affects the transfer performance and the printed film layer (4) plays a role as the base layer for breakage prevention in the transfer of the glossy image part including the metal layer (3).

In the meantime, it was confirmed that the adhesive of the above-mentioned composition exhibits a bond strength of approximately 4 to 15 kg/cm$^2$ when applied to polyester film, paper, or acetate film and causes no delamination at the time of transfer. It was also confirmed that in the case where good transfer is achieved, the bond strength between the metal layer (3) and the printed film layer (4) is approximately 50 kg/cm$^2$ and the bond strength between the printed film layer (4) and the adhesive layer (5) is greater than approximately 4 kg/cm$^2$.

EXAMPLE 2

The image part was formed by using a photosensitive material and a negative film in the same way as in Example 1, as shown in FIG. 5. In Example 1, the adhesive layer (5) was formed on the entire surface after the image part had been formed by etching. In this example, however, the adhesive layer (5) was previously formed and the photosensitive material layer (10) was formed thereon and it was exposed through a negative film (11) placed thereon. Therefore, the adhesive layer (5) was formed only on the image part and there is no possibility of the adhesive being transferrred from the non-image part to an object. Nevertheless, the transfer of the image part was as good as in Example 1 owing to the printed film layer (4).

The production process is shown in FIG. 5. The steps up to the forming a laminate composed of substrate (2) of printed film layer (4) are the same as in Example 1.

Figure 5A:
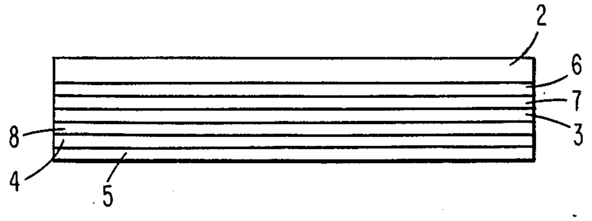

The printed film layer (4) 7 μm in thickness was made from the ink of composition No. 2 as used in Example 1. The adhesive layer (5) was made from a 50:50 mixture of Chromatec Adhesive and Chromatec High-performance Adhesive (both are products of Letraset Japan K.K.). It was formed on the printed film layer (4). Thus there was obtained a sheet as shown in FIG. 5(A).

The pressure sensitive adhesive as mentioned above is a mixture of a high-viscosity pressure-sensitive adhesive and a non-tacky component. It should exhibit a low tackiness under a load smaller than approximately 4 kg/cm$^2$ and also exhibit a substantial tackiness under a load greater than approximately 4 kg/cm$^2$. The use of such an adhesive prevents the transfer of an unnecessary part to an object and makes it easy to adjust the transfer position.

Figure 5B:
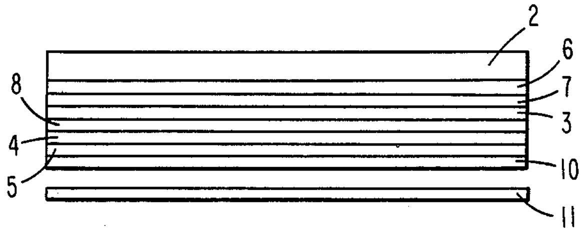
Figure 5C:
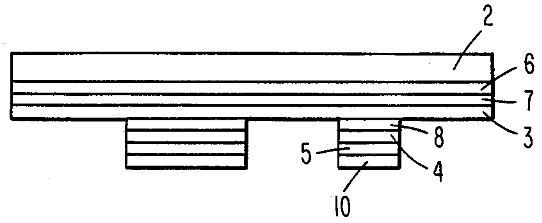

To form an image part on the sheet thus obtained, the photosensitive layer (10) was formed on the adhesive layer (5), and then it was exposed through the negative film (11), as shown in FIG. 5(B). The nonimage part of the photosensitive material which had not been exposed was washed out with water, followed by development with Chromatec developing solution (made by Letraset Japan K.K.). Thus the image part was formed as shown in FIG. 5(C).

Figure 5D:
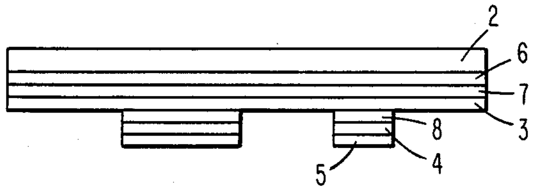
Figure 5E:
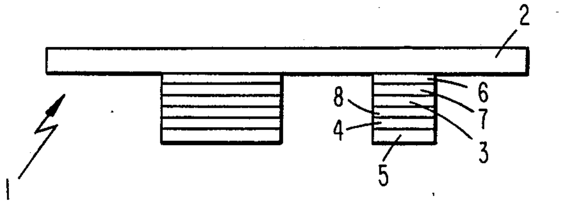

Then, the film of photosensitive material which had been cured by exposure was removed by using Chromatec D3 Developer (made by Letraset Japan K.K.), as shown in FIG. 5(D). Finally, the sheet was subjected to etching with 15% NaOH aqueous solution to remove the metal layer (3), the coloring layer (7), and the release layer (6). Thus there was obtained the transfer sheet (1) having the adhesive layer (5) on the image part, as shown in FIG. 5(E).

A transfer sheet in this example was as good in transfer performance as that in Example 1 so long as the printed film layer (4) was made under the same conditions.

EXAMPLE 3

Figure 6A:
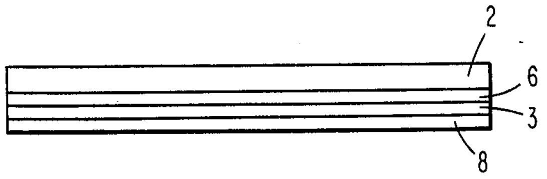
Figure 6B:
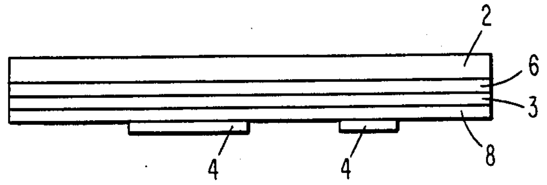

A transfer sheet as shown in FIG. 6(A) was prepared. The substrate (2) is 0.05 mm thick polyester film. The release layer (6) 2 μm thick was formed on the substrate. On the release layer was formed by vacuum deposition of aluminum metal layer (3) 5 μm thick. The metal layer (3) was covered with the 2 μm thick protective topcoat (8). No coloring layer was formed. The peel strength between the substrate (3) and the metal layer (3) was about 6 g/25 mm width. On the sheet thus obtained was formed the printed film layer (4) by silk screen printing with an ink of the following composition, as shown in FIG. 6(B).

| | | |
|---|---|---|
| Composition 4: | Nitrocellulose | 30 parts by weight |
| | TCP | 8 parts by weight |
| | Ethyl acetate | 10 parts by weight |
| | Thinner | 49 parts by weight |
| | Titanium white | 3 parts by weight |
| Composition 5: | Polyurethane ink, white (made by Dainippon Ink Kagaku Kogyo K.K.) | |

Figure 6C:
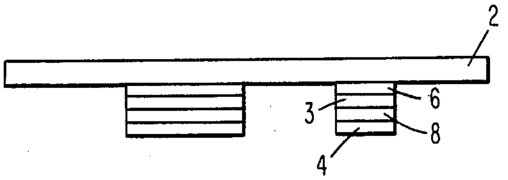
Figure 6D:
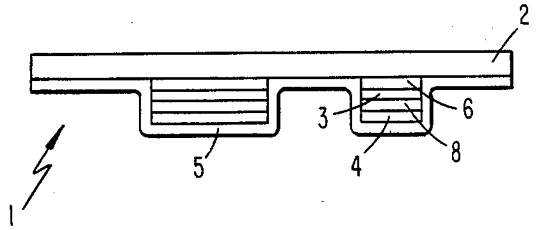

Then, the metal layer (3) and the release layer (6) under the non-image part were removed by etching with 15% NaOH aqueous solution to give the silvery image as shown in FIG. 6(C). Finally, the entire surface of the image part and non-image part was covered with the pressure-sensitive adhesive by using a bar coater, followed by drying, to form the adhesive layer (5). Thus there was obtained the transfer sheet (1) as shown in FIG. 6(D).

The transfer sheet (1) thus obtained was examined for transfer performance. The transfer of the image part to drawing paper and polyester film was satisfactory, with very little transfer of the adhesive on the non-image part. The relationship between the elongation at break of the printed film layer (4) and the transfer performance was investigated by measuring the physical properties of the film formed by casting each ink of the above-composition No. 4 and No. 5 on a glass plate, in the same manner as in Example 1. Test results were as follows:

| Sample No. | No. 5 | No. 6 |
|---|---|---|
| Kind of ink | Compn. 4 | Compn. 5 |
| Thickness of printed film layer (μm) | 5 | 5 |
| Transfer performance | Good | Good |
| Elongation at break (%) | 10 | 15 |

It was found that it was made possible also in this example to achieve good transfer of the image to an object without crack and breakage as the result of using as the printed film layer (4) a material which has an elongation at break in large excess of 5%.

The material of the printed film layer (4) as explained in the above-mentioned examples is one of the samples experimented in various ways. Using them as the fundamental data, a comprehensive ascertainment was made. As a result, it was found that if a material having an elongation at break greater than approximately 4% is selected as the printed film layer (4), it is possible to secure good adhesion which causes no delamination due the affinity for the adhesive layer (5) and it is also possible to minimize the stress concentration which occurs at the time of transfer to an object and peeling, whereby good transfer of the image part is made possible.

It was also found that the essential conditions of achieving good transfer is to use a material having an elongation at break greater than approximately 4% as the printed film layer (4) is mentioned above and this provides a commodity that has nearly satisfactory transfer performance. Preferably the thickness of the printed film transfer (4) should be greater than approximately 4 μm, and this ensures transfer and permits a thin metal layer (3) having a foil thickness lower than 10 μm to be transferred satisfactorily.

The following are the preferred additional conditions that permit the good transfer of the image part without delamination.

The adhesive should have an adhesion strength greater than 4 kg/cm$^2$, which is equivalent to the transfer pressure disclosed in U.S. Pat. No. 3,131,106. Such an adhesive permits the adjustment for accurate transfer position on an object.

The adhesion strength between the metal layer (3) and the printed film layer (4) and between the printed film layer (4) and the adhesive layer (5) should be greater than the adhesion strength between the adhesive layer (5) and the object. This prevents such a trouble that the adhesive layer (5) alone is transferred to an object, and also prevents delamination at the time of transfer. The layer-to-layer adhesion strength should be greater than approximately 4 kg/cm$^2$.

The adhesion strength between the substrate (2) and the metal layer (3) should be less than approximately 10 g/25 mm width. This permits the substrate to be released easily after transfer.

Effect of the invention:

As mentioned above, the transfer sheet of this invention is made of a substrate, an image part which is a laminate of metal layer and printed film layer, and an adhesive layer which covers at least the image part. The printed film layer has an elongation at break greater than approximately 4%. The transfer sheet of such a structure permits the sure transfer of the image part without resorting to an adhesive having a high adhesion strength. Moreover, it prevents the transfer of an unnecessary part of adhesive and makes it easy to adjust the transfer position. In the case of a transfer sheet of such a structure that the adhesive layer is made all over the surface including both the image part and non-image part, the adhesive on the image part is not transferred to an object. Since the printed film layer functions as a base layer of the laminate transferred to an object, the metal layer can be made thin. This permits the image part having metallic luster to be neatly transferred to curved surfaces of an object. This adds to the commercial value of the transfer sheet of this invention.

What is claimed is:

1. In an improved transfer sheet of a type having a flexible substrate, an image part, and an adhesive layer, transfer of the image part being performed by pressing the transfer sheet against an object with the adhesive layer in contact with the object, the improvement comprising said image part being a laminate including a metal layer and a printed film layer and an adhesive layer formed at least on the image part, the printed film layer having a tensile strength and thereby an elongation at break greater than approximately 4%, wherein the metal layer has a thickness smaller than approximately 10 micrometers and the printed film layer has a thickness greater than approximately 4 micrometers, the thicknesses of the metal layer and said printed film layer co-acting with the tensile strength of the printed film layer to prevent damage and cracks from occurring in one of the printed film layer and the metal layer tending to be caused by rubbing pressure against the transfer sheet during transfer of the image part.

2. A transfer sheet as set forth in claim 1, wherein the peel strength between the flexible substrate and the metal layer is smaller than approximately 10 g/25 mm width, the adhesion strength between the metal layer and the printed film layer is greater than approximately 4 $kg/cm^2$, and the adhesion strength between the printed film layer and the adhesive layer is greater than approximately 4 $kg/cm^2$.

* * * * *

UNITED STATES PATENT AND TRADEMARK OFFICE
CERTIFICATE OF CORRECTION

PATENT NO. : 4,677,015

DATED : June 30, 1987

INVENTOR(S) : Michio ITO; Kiyoshi KAMBAYASHI and Junichi TAKEZAWA

It is certified that error appears in the above-identified patent and that said Letters Patent is hereby corrected as shown below:

Cover page, item [73] should be changed as follows:

--[73] Assignee: Nippon Seiki Co., Ltd., Niigata-pref., Japan and Nissei Service Co., Ltd., Niigata-pref., Japan--

Signed and Sealed this

Twenty-fourth Day of November, 1987

*Attest:*

DONALD J. QUIGG

*Attesting Officer* *Commissioner of Patents and Trademarks*